United States Patent
Olbrich

(10) Patent No.: US 11,826,839 B2
(45) Date of Patent: *Nov. 28, 2023

(54) ARMORED CABLE CUTTER WITH CUTTING BLADE RETENTION

(71) Applicant: Milwaukee Electric Tool Corporation, Brookfield, WI (US)

(72) Inventor: Nathaniel P. Olbrich, Milwaukee, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/459,252

(22) Filed: Aug. 27, 2021

(65) Prior Publication Data

US 2021/0387270 A1 Dec. 16, 2021

Related U.S. Application Data

(63) Continuation of application No. 16/547,227, filed on Aug. 21, 2019, now Pat. No. 11,110,528.

(60) Provisional application No. 62/725,368, filed on Aug. 31, 2018.

(51) Int. Cl.
| | |
|---|---|
| *B23D 35/00* | (2006.01) |
| *H02G 1/00* | (2006.01) |
| *B23D 17/06* | (2006.01) |

(52) U.S. Cl.
CPC ........... *B23D 35/002* (2013.01); *B23D 17/06* (2013.01); *B23D 35/001* (2013.01); *H02G 1/005* (2013.01)

(58) Field of Classification Search
CPC .... B23D 35/002; B23D 35/001; B23D 17/06; B23D 29/00; B23D 17/00; B23D 35/005; B23D 29/002; B23D 35/008; H02G 1/005; E04G 23/082; B25B 28/00; E02F 3/965; Y10T 83/8815
USPC .... 83/563, 134, 209, 928; 30/134, 228, 231, 30/266; 81/9, 44
See application file for complete search history.

(56) References Cited

U.S. PATENT DOCUMENTS

| | | | | |
|---|---|---|---|---|
| 3,059,334 | A | * | 10/1962 | Joers .................... B23D 29/002 30/228 |
| 4,519,135 | A | * | 5/1985 | LaBounty .............. B23D 17/00 83/609 |
| 4,838,493 | A | | 6/1989 | LaBounty |
| 5,187,868 | A | | 2/1993 | Hall |
| 5,926,958 | A | * | 7/1999 | Ramun ................... E02F 3/965 30/228 |
| 6,230,542 | B1 | * | 5/2001 | Frenken ................. B25B 27/10 30/228 |
| 6,839,969 | B2 | | 1/2005 | Jacobson et al. |

(Continued)

*Primary Examiner* — Ghassem Alie
(74) *Attorney, Agent, or Firm* — Quarles & Brady LLP

(57) ABSTRACT

A cutting head for a hydraulic power tool includes a first jaw that includes a first ear configured with a slot for receiving a corresponding ear. The second jaw includes a second ear with a third ear bore that aligns in between a first ear bore and to a second ear bore of the first ear when the second ear is coupled in the slot of the first ear. The cutting head further includes a spring-biased flange coupled to a blade mounted to the first jaw and a retained coupled at a fixed position to a blade mounted to the second jaw. The retainer is configured to receive the flange during a cutting action such that the flange prevents the blades from shifting out of alignment during the cutting action.

11 Claims, 8 Drawing Sheets

(56) References Cited

U.S. PATENT DOCUMENTS

| | | | |
|---|---|---|---|
| 7,216,575 B2 | 5/2007 | Alseth et al. | |
| 8,146,256 B2 | 4/2012 | Johnson et al. | |
| 9,816,320 B1* | 11/2017 | Herrick | E21B 7/04 |
| 2005/0081388 A1* | 4/2005 | Konen | B23D 29/002 |
| | | | 30/92 |
| 2010/0107843 A1* | 5/2010 | Lefavour | B23D 17/06 |
| | | | 83/600 |
| 2015/0089816 A1 | 4/2015 | Chiasson et al. | |
| 2016/0252112 A1 | 9/2016 | Kehoe et al. | |
| 2017/0317461 A1 | 11/2017 | Wason et al. | |
| 2017/0355027 A1* | 12/2017 | D-Antuono | B23P 11/005 |
| 2018/0326600 A1 | 11/2018 | Wason et al. | |
| 2019/0151967 A1 | 5/2019 | Kehoe et al. | |
| 2019/0275595 A1* | 9/2019 | Jacobson | E04G 23/082 |
| 2019/0308255 A1 | 10/2019 | Wason | |
| 2020/0078875 A1* | 3/2020 | Kargenian | B23D 17/04 |

* cited by examiner

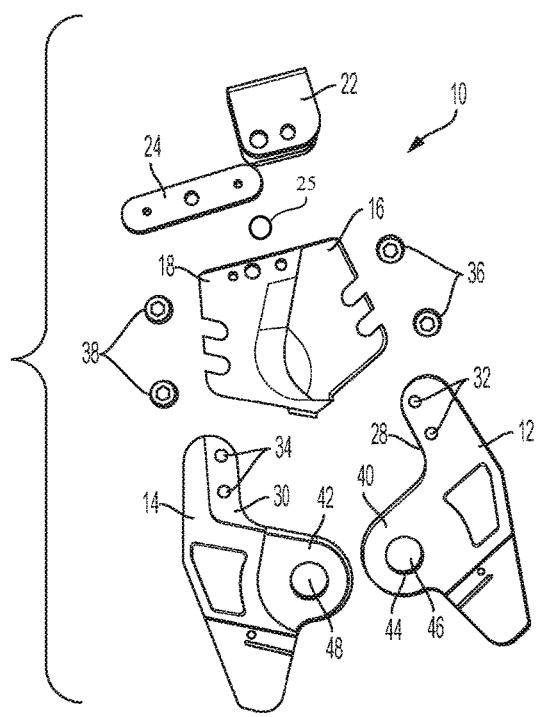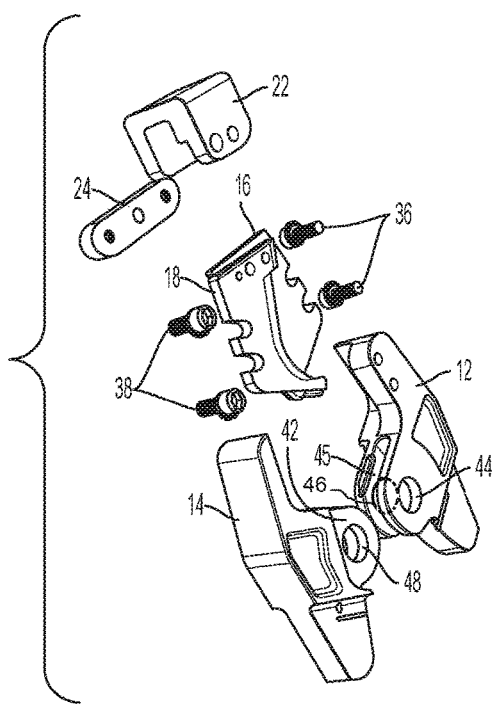
FIG. 2A
FIG. 2B

ARMORED CABLE CUTTER WITH CUTTING BLADE RETENTION

CROSS-REFERENCE TO RELATED APPLICATION

The present application is a continuation of U.S. patent aplication Ser. No. 16/547,227, filed Aug. 21, 2019, which claims priority to U.S. Provisional Patent Application No. 62/725,368, filed Aug. 31, 2018, the entire contents of which are herein incorporated by reference.

FIELD

The present disclosure relates generally to power tools. More particularly, the present disclosure relates to an armored cable cutter power tool configured with cutting blade retention.

BACKGROUND

Hydraulic crimpers and cutters are different types of hydraulic power tools for performing work (e.g., crimping or cutting) on work piece. In such tools, a hydraulic tool comprising a hydraulic pump is utilized for pressurizing hydraulic fluid and transferring it to a cylinder in the tool. This cylinder causes an extendible piston to be displaced towards a crimping head. The piston exerts a force on the crimping head of the power tool, which may typically include opposed jaws with certain crimping features, depending upon the particular configuration of the power tool. In this case, the force exerted by the piston may be used for closing the jaws to perform crimp or compression on a work piece at a targeted crimp location.

Certain hydraulic cutting tools and associated cutting heads are known. For example, one known hydraulic cutting tool head utilizes jaws that pivot about a pivoting point axis. Both jaws of such a cutting tool head may have a respective ear through which a pivot pin is placed so that the jaw(s) can pivot about the pivot pin. These ears may interlock, and one or both jaws may have a cutting blade of which a portion rests on that jaw's ear so that, when the jaws are closed, the blades pass by each other. There are certain perceived disadvantages of utilizing a cutting tool head such as this, however. For example, when cutting certain workpieces, particular those that typically require more force to cut through, the jaws can jam before the workpiece is fully cut through. Further, a cutting action with this cutting tool head can cause the jaws, and thus in turn the blades, to be forced apart. In particular, the cutting force can push each blade against the surface to which the blade is mounted, which causes the blades/jaws to be pushed apart.

Therefore, there is a need for a hydraulic cutting tool that may be used to achieve a full, controllable cut while minimizing or eliminating the force that tends to push the blades apart during a cutting action.

SUMMARY

According to an exemplary arrangement, an armored cable cutting head configured with cutting blade retention for a hydraulic power tool is disclosed. An example cutting head for a hydraulic power tool may comprise a set of hollow pins and a first jaw disposed for rotation about an axis defined by the set of hollow pins, the first jaw comprising a first blade mounting surface having a first pair of screw bores configured to receive a first pair of blade mount screws and further comprising a first ear. The first ear includes a first ear bore and a second ear bore for receiving the set of hollow pins and a slot for receiving a corresponding ear. The cutting head may further comprise a second jaw disposed for rotation about the axis defined by the set of hollow pins, the second jaw comprising a second blade mounting surface having a second pair of screw bores configured to receive a second pair of blade mount screws and further comprising a second ear having a third ear bore such that the third ear bore aligns in between the first ear bore and the second ear bore of the first ear when the second ear is coupled in the slot of the first ear. The second ear comprises the third ear bore for receiving a pivot pin extending through the set of hollow pins. The cutting head may further comprise a first blade mounted to the first blade mounting surface of the first jaw by the first pair of blade mount screws and a second blade mounted to the second blade mounting surface of the second jaw by the second pair of blade mount screws. The cutting head may also include a flange coupled to the first blade. The flange may be spring-biased toward an extended configuration. The cutting head may also include a retainer for receiving the flange coupled to the first blade during a cutting action. The retainer may be mounted to the second blade at a fixed position. As such, the jaws may rotate about the axis defined by the set of hollow pins causing the retainer to receive the flange such that the flange prevents the first blade and the second blade from shifting out of alignment during the cutting action.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and descriptions thereof, will best be understood by reference to the following detailed description of an illustrative embodiment of the present disclosure when read in conjunction with the accompanying drawings, wherein:

FIG. 2A illustrates an exploded view of the cutting head illustrated in FIG. 1.

FIG. 2B illustrates another perspective of the exploded view of the various components making up the cutting head illustrated in FIG. 1.

DETAILED DESCRIPTION

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and complete and will fully convey the scope of the disclosure to those skilled in the art.

Figure 1:
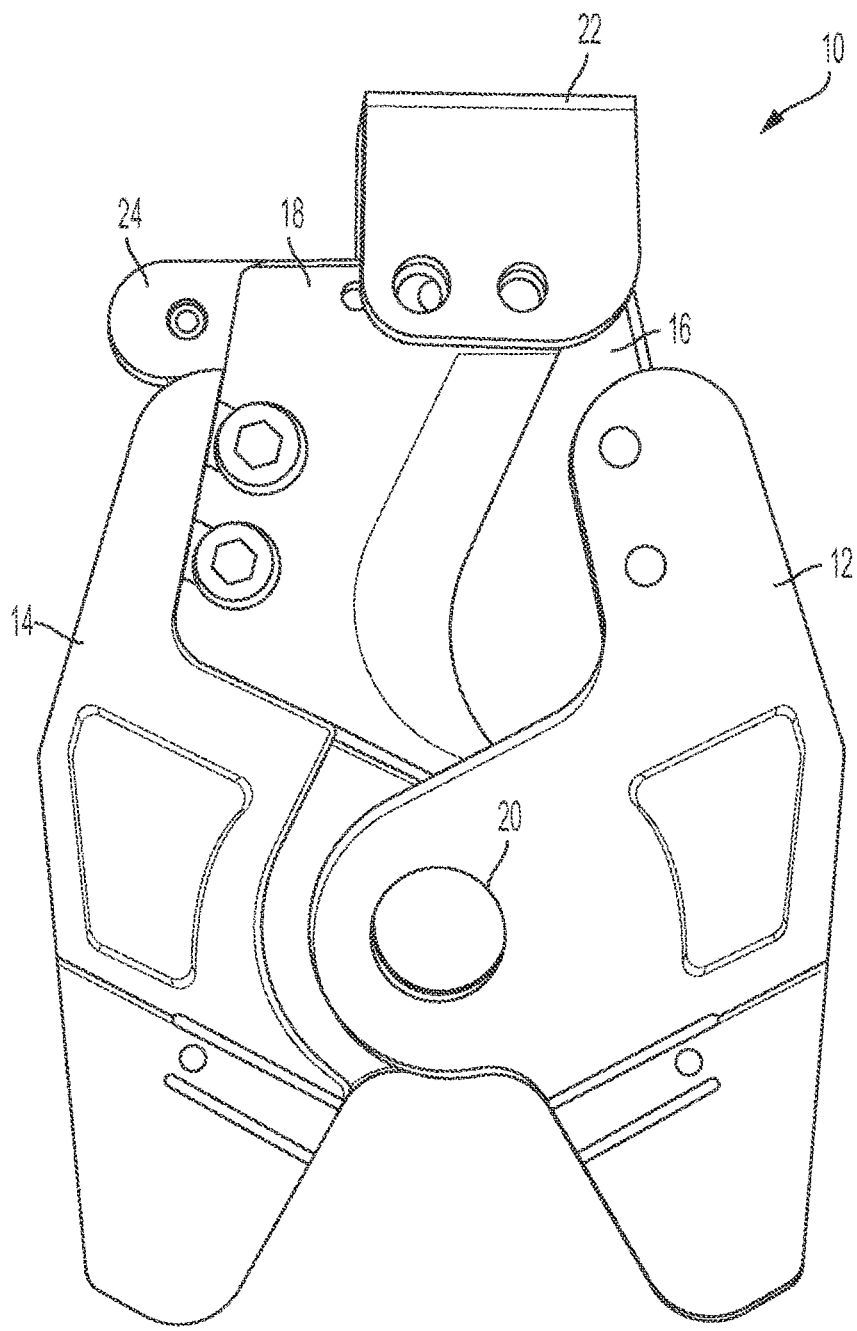
FIG. 1 illustrates a perspective view of a cutting head.

FIG. 1 illustrates a cutting head 10 for use with a hydraulic power tool. The cutting head 10 represents an example configuration of an armored cable cutting head with cutting blade retention. By including components configured to retain blades of the cutting head 10 during cutting actions, the cutting head 10 can cut materials, such as cables and wires without one or both blades shifting off a predefined axis that the blades should follow during a cut. As a result, the cutting head 10 can cut materials without one or both blades shifting off alignment during use.

The configuration of the cutting head 10 can vary within example embodiments. In addition, the size, configuration and materials used to generate the different components within the cutting head 10 can differ within examples. For instance, the cutting head 10 can consist of different types of metals.

As shown in FIG. 1, the cutting head 10 includes a first jaw 12 and a second jaw 14. The first jaw 12 and the second jaw 14 provide structure to the cutting head 10. In addition, the cutting head 10 further comprises a pair of blades. The pair of blades includes a first blade 16 shown mounted to the first jaw 12 and a second blade 18 shown mounted to the second jaw 14. The pair of blades 16, 18 are removably mounted to the jaws 12, 14, which enables replacing the blades, such as after repeated use.

The cutting head 10 further comprises an opening 20. A set of hollow pins (e.g., one or more hollow pins not shown in FIG. 1) can be placed in the opening 20 to further hold the first jaw 12 and the second jaw 14 together. For example, the first jaw 12 and the second jaw 14 can be coupled together using a press fit that further utilizes the set of hollow pins to secure the jaws 12, 14 together. The first jaw 12 and the second jaw 14 can then be attached to a tool (e.g., hydraulic power tool). For instance, the jaws 12, 14 can be attached to the tool by a pivot pin that goes through the hole and the set of hollow pins. The pivot pin (or combination of the pivot pin and set of hollow pins) can define an axis about which the jaws 12, 14 rotate.

In addition, FIG. 1 also illustrates a fixed retainer 22 coupled to the second blade 18 and a flange 24 coupled to the first blade 16. In particular, the fixed retainer 22 may be mounted to the second blade 18 such that the fixed retainer 22 is not movable relative to the first blade 16 (i.e., at a fixed position on the first blade 16). The fixed retainer 22 can be mounted to the second blade 18 using fasteners and slots in the second blade 18, adhesives, or in other ways within examples. As such, the fixed retainer 22 is shown with an inner groove configured to receive the flange 24 prior to and during cutting actions using the cutting head 10. The shape and configuration of the fixed retainer 22 can vary within example embodiments. For instance, the size and shape of the groove of the fixed retainer 22 can differ depending on the size and configuration of the flange 24.

The flange 24 represents a movable flange (e.g., guide bar) that can change position during use of the cutting head 10. For instance, the flange 24 may be a spring-loaded, movable flange that is coupled to the first blade 16. For example, the flange 24 may be spring-loaded via a spring 25. The spring 25 may rotationally bias the flange 24 and can be configured as a torsion spring or a spiral spring at the coupling location of the flange 24 and the first blade 16, for example. The spring-loaded may cause the flange 24 to have an extended position that would extend into the fixed retainer 22 during use unless the flange 24 is repositioned in an open position.

The flange 24 can be coupled to the first blade 16 using a fastener that enables the flange 24 to rotate relative to a fixed coupling point on the first blade 16. As such, the flange 24 can be configured to move relative to the first blade 16 such that the combination of the flange 24 and the fixed retainer 22 help position a cable or another material into a location between the first blade 16 and the second blade 18 for cutting by cutting head 10. During operation of the cutting head 10 to cut a material, the motion of the first jaw 12 and the second jaw 14 can cause the flange 24 to engage with the fixed retainer 22. By engaging with the fixed retainer 22 that is securely positioned on the first blade 16, the flange 24 can serve to guide the first blade 16 in a desired path with respect to the second blade 18 to perform a cutting motion. The combination of the fixed retainer and the flange 24 can prevent the first blade 16 and the second blade 18 from moving off axis or away from each other during the cutting motion. This, in turn, prevents slippage by the blades during cutting actions to ensure wires and other materials are cut as desired by the cutting head 10. As such, the flange 24 can be positioned and configured such that it only interacts with the fixed retainer 22.

In some examples, the flange 24 may include one or more detent plungers. The detent plunger or plungers, also described as pins, can be used to hold the flange 24 at a location out of the way while a wire is inserted for cutting. For instance, an end of the detent plunger can be inserted into an indented hole in the first blade 16 in order to position the flange 24 out of the way. As such, the detent plunger or plungers may enable adjusting the position of the flange 24 while the flange 24 remains mounted to the first blade 16 (e.g., rotating the flange 24 with respect to the first blade 16). The detent plunger may be pressed into the flange 24 and the other end of the detent plunger can then go into the indented hole on the first blade 16 to lock the flange 24 in an extended position.

Although not shown in FIG. 1, the cutting head 10 can be part of a hydraulic power tool. In one embodiment, the hydraulic power tool can comprise an electric motor, a pump driven by the motor, and a housing defining a cylinder therein. An extendable piston can be disposed within the cylinder. The pump can provide pressurized hydraulic fluid to the piston cylinder, causing the piston to extend from the housing to thereby actuate the jaws 12, 14 of the cutting head 10 for cutting a workpiece, such as a wire, cable, or another type of material. Other power sources can be used to power the tool. Once a workpiece or other target is placed between the jaws 12, 14, the hydraulic power tool can be powered to close the jaws 12, 14 to perform a cutting action and cut the workpiece or other target.

FIG. 2A illustrates an exploded view of the various components making up the cutting head 10 illustrated in FIG. 1. Shown again are the first jaw 12, the second jaw 14, the first blade 16, the second blade 18, the fixed retainer 22, and the flange 24. When the jaws 12, 14 are assembled together, a set of hollow pins (e.g., one or more hollow pins) can define an axis for the jaws 12, 14 about which the jaws 12, 14 rotate. This enables rotational movement of the jaws 12, 14 about the axis, such as during a cutting action. In some examples, a pivot pin is positioned such that the pivot pin extends through the set of hollow pins.

Each jaw has a respective blade mounting surface onto which to mount the blades 16, 18. In particular, the first jaw 12 has a first blade mounting surface 28 and the second jaw 14 has a second blade mounting surface 30. Each of the blade mounting surfaces 28, 30 can be substantially planar. The blading mounting surfaces 28, 30 can have different configurations within other example embodiments of the cutting head 10.

Each jaw also includes a pair of screw bores configured to receive blade mount screws for mounting the blades 16, 18 to the jaws 12, 14. In particular, the first jaw 12 includes a first pair of screw bores 32 configured to receive a first pair of blade mount screws 36, and the second jaw 14 includes a second pair of screw bores 34 configured to receive a second pair of blade mount screws 38. Each pair of screw bores 32, 34 can be threaded so as to securely hold the pairs of blade mount screws 36, 38. Other types of fasteners and fastener receivers can be used within other example embodiments of the cutting head 10.

The blades 16, 18 each include a pair of notches on a side of the blade opposite the side of the blade's edge. The pair of notches can be used for mounting the blades 16, 18 to the jaws 12, 14. In particular, to mount the first blade 16, the first blade 16 is positioned on the first blade mounting surface 28 and the first pair of blade mount screws 36 are inserted through the pair of notches in the first jaw 12, through the first pair of screw bores 32, and then tightened to secure the first blade 16 into place. Likewise, to mount the second blade 18, the second blade 18 is positioned on the second blade mounting surface 30 and the second pair of blade mount screws 38 are inserted through the pair of notches in the second jaw 14, through the first pair of screw bores 34, and then tightened to secure the second blade 18 into place. In alternative embodiments, each blade could include a pair of screw bores instead of a pair of notches. Further, more or fewer notches, screw bores, and screws can be used in other embodiments.

The first blade 16 further includes slots for coupling the flange 24 to the first blade 16. In particular, the slots can vary depending on the configuration of the flange 24. As such, the flange 24 is coupled to the first blade 16 and can move relative to the flange 24 during cutting actions such that the flange 24 aligns with the inner groove of the fixed retainer 22. Various adhesives or fasteners can be used to couple the flange to the first blade 16.

The second blade 18 further includes slots for coupling the fixed retainer 22 to the second blade 18 at a fixed location. In particular, the slots can vary depending on the configuration of the fixed retainer 22. As such, the fixed retainer 22 can be coupled to the second blade 18 such that the fixed retainer 22 can receive the flange 24 during cutting actions performed by the cutting head 10. By receiving the flange 24, the fixed retainer 22 can prevent the first blade 16 and the second blade 18 from shifting off alignment during a cutting action, including while cutting heavy materials.

As further illustrated in FIG. 2A, the jaws 12, 14 each have ears for rotational engagement with each other. The first jaw 12 includes a first ear 40 that includes a first ear bore 44 and a second ear bore 46 for receiving hollow pins. The first ear 40 also includes a slot 45 (shown in FIG. 2B) for receiving a corresponding ear, such as the second ear 42 of the second jaw 14. The slot 45 enables an opposing ear to be positioned in between the first ear bore 44 and the second ear bore 46.

The second jaw 14 includes a second ear 42 that includes a third ear bore 48. The third ear bore 48 aligns in between the first ear bore 44 and the second ear bore 46 of the first ear 40 when the second ear 42 is coupled in the slot 45 of the first ear 40. The second ear 42 includes the third ear bore 48 for receiving a pivot pin that can extend through the hollow pins and all three ear bores. When the cutting head 10 is assembled, the second ear 42 extends into the slot of the first ear 40 such that they rotationally engage with each other.

As shown, each ear can have one or more bores. As such, to bring the jaws 12, 14 together, the bores of the ears are aligned (i.e., the third ear bore 48 is inserted and aligned in between the first ear bore 44 and the second ear bore 46) using a press-fit configuration (e.g., a press-fit ring). Friction after the third ear bore 48 is aligned in between the first ear bore 44 and the second ear bore 46 can secure the jaws 12, 14 together. The tightness of fit may be controlled by amount of interference arising from the third ear bore 48 being placed in between the first ear bore 44 and the second ear bore 46. In order to initially position the third ear bore 48 in between the first ear bore 44 and the second ear bore 46, force is applied, which may involve hydraulics, small hand-operated presses, another source (e.g., by a person). In some examples, thermal expansion may be used when assembling the jaws 12, 14 together. One or more hollow pins and a pivot pin may be used to further secure the jaws 12, 14 together.

In another example, a pivot pin can be inserted through the bores so that a head of the pivot pin rests against one of the jaws 12, 14. For example, a pivot pin could be inserted through the bores so that the head of the pivot pin rests against the second jaw 14. A nut or another fastener component can then be placed around the opposite end of the pivot pin (e.g., the end closer to the first jaw 12) and a set screw can be inserted into a bore of the nut to hold the nut in place around the pivot pin. The nut can include a groove for receiving an end of the set screw when the set screw is screwed into place. The nut thus securely holds the jaws 12, 14 together. Other techniques could be used to securely assemble the jaws 12, 14 together, such as adhesive, jam nut (e.g., with a hollow bolt), or any other suitable technique. In some examples, a nut used to couple around an end of the pivot pin can be a hex nut and the set screw can be a cone point set screw, although other types of nuts and set screws are possible as well.

FIG. 2B illustrates another perspective of the exploded view of the various components making up the cutting head 10 illustrated in FIG. 1. Particularly, the fixed retainer 22 is shown having a configuration that enables the fixed retainer 22 to be mounted to a top portion of the second blade 18. The fixed retainer 22 is also shown with an inner groove for receiving the flange 24 during the performance of a cutting action using the cutting head 10.

As further shown in FIG. 2B, the second ear 42 of the second jaw 14 can extend into the slot 45 positioned in the first ear 40 of the first jaw 12. As a result, the third ear bore 48 can align in between the first ear bore 44 and the second ear bore 46 when the first jaw 12 and the second jaw 14 are assembled together using a press fit technique, hollow pins and a pivot pin, or another fastening device.

Figure 3A:
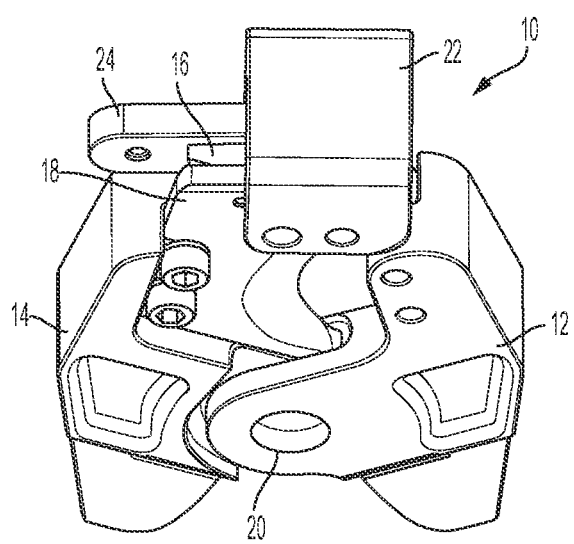
FIG. 3A illustrates a perspective view of the cutting head illustrated in FIGS. 1, 2A, and 2B.

FIG. 3A illustrates a perspective view of the cutting head 10 illustrated in FIGS. 1, 2A, and 2B. As shown when the cutting head 10 is in a closed position, the flange 24 coupled to the first blade 16 can be aligned according to the inner groove of the fixed retainer 22. The fixed retainer 22 is shown mounted at a fixed position to the second blade 18. By using the combination of the fixed retainer 22 and the flange 24, the first blade 16 and the second blade 18 can be guided according to a predefined axis created when the the first jaw 12 and the second jaw 14 are assembled together.

Figure 3B:
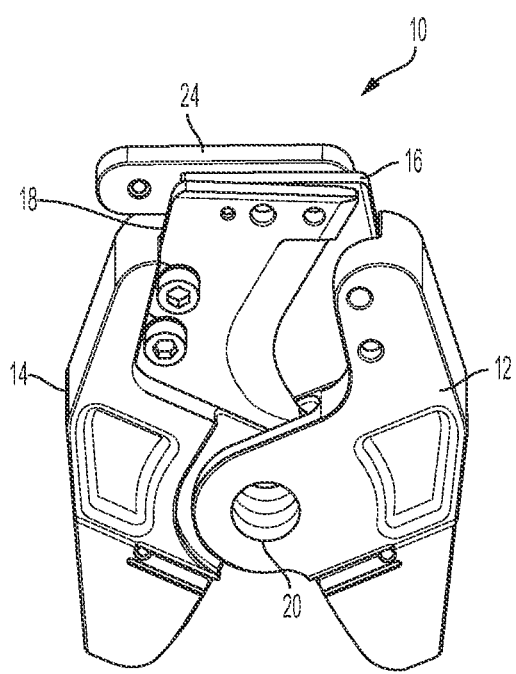
FIG. 3B illustrates the perspective view of the cutting head illustrated in FIG. 3A without the fixed retainer.

FIG. 3B illustrates the perspective view of the cutting head illustrated in FIG. 3A without the fixed retainer 22. As shown, the flange 24 is coupled to and aligns with the first blade 16 mounted to the first jaw 12 such that the flange 24 is guided and extends into the inner groove of the fixed retainer 22 coupled to the second blade 18.

Figure 4A:
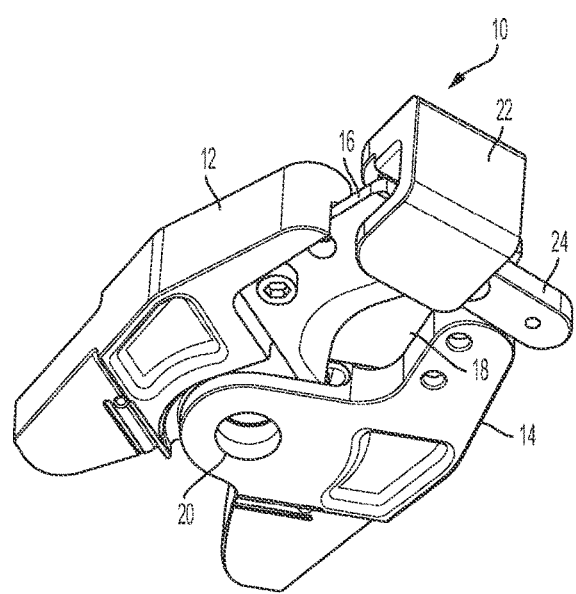
FIG. 4A illustrates another perspective view of the cutting head illustrated in FIGS. 1-3B.
Figure 4B:
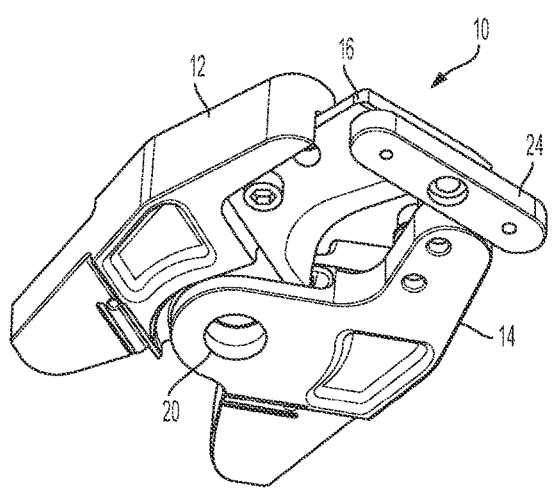
FIG. 4B illustrates the perspective of the cutting head illustrated in FIG. 4A without the fixed retainer and the second blade.

FIG. 4A illustrates another perspective view of the cutting head 10 illustrated in FIGS. 1-3B. And FIG. 4B illustrates the perspective of the cutting head illustrated in FIG. 4A without the fixed retainer 22 and the second blade 18.

Figure 5A:
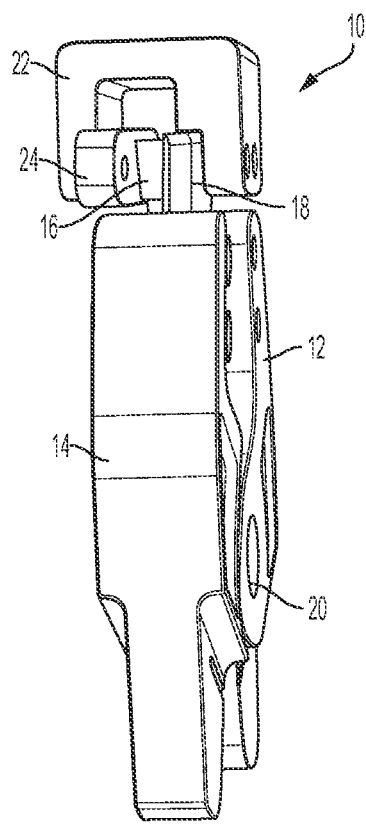
FIG. 5A illustrates yet another perspective view of the cutting head illustrated in FIGS. 1-4B.
Figure 5B:
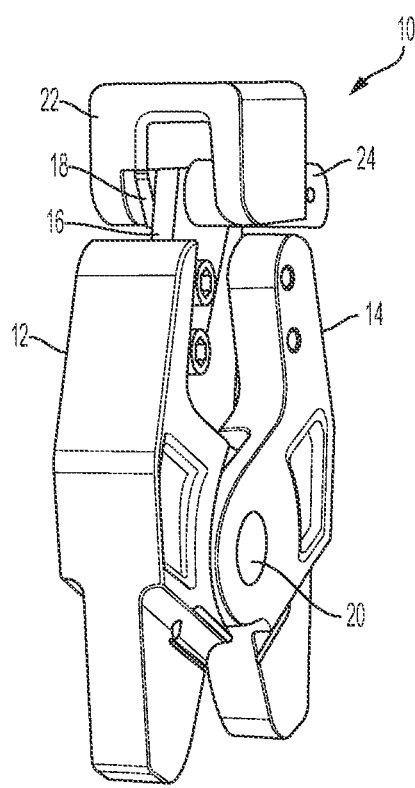
FIG. 5B illustrates an additional perspective view of the cutting head illustrated in FIGS. 1-5A.

FIG. 5A illustrates yet another perspective view of the cutting head 10 illustrated in FIGS. 1-4B. And FIG. 5B illustrates an additional perspective view of the cutting head 10 illustrated in FIGS. 1-5A.

Figure 6A:
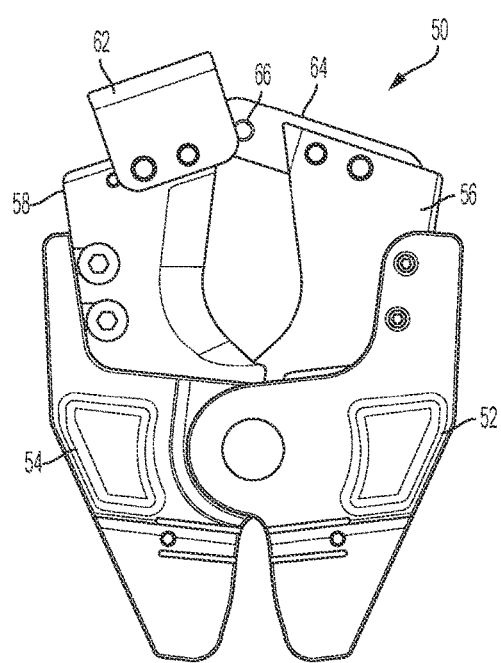
FIG. 6A illustrates a perspective view of the cutting head configured with detent plungers.

FIG. 6A illustrates a perspective view of a cutting head 50 configured with detent plungers 66, 68. Similar to the cutting head 10 shown in FIGS. 1-5B, the cutting head 50 includes a first jaw 52, a second jaw 54 and a pair of blades. In particular, a first blade 56 is shown mounted to the first jaw 52 and a second blade 58 is shown mounted to the second jaw 54. The cutting head 50 further includes a fixed retainer 62 coupled to the second blade 58 and a flange 64 coupled to the first blade 56.

As further shown in FIG. 6A, the flange 64 includes a first detent plunger 66 coupled to a first slot in the flange 64 and a second detent plunger coupled to a second slot in the flange 64 (not shown). The first detent plunger 66 and second detent plunger may be used to position the flange 64 at a location out of the way for a wire or another material to be inserted for a cutting action. To hold the flange 64 in a location, the ball of the first detent plunger 66 may inserted into an indentation hole in the first blade 56. This way, the flange 64 is rotated and positioned out of the way of a wire or another material inserted for cutting by the cutting head 50. The second detent plunger may be similarly used to adjust the position of the flange 64. The flange 64 may include both the first detent plunger 66 and a second detent plunger to enable a user to use one or the other without having to rotate the flange 64 all the way around (i.e., 360 degrees).

Figure 6B:
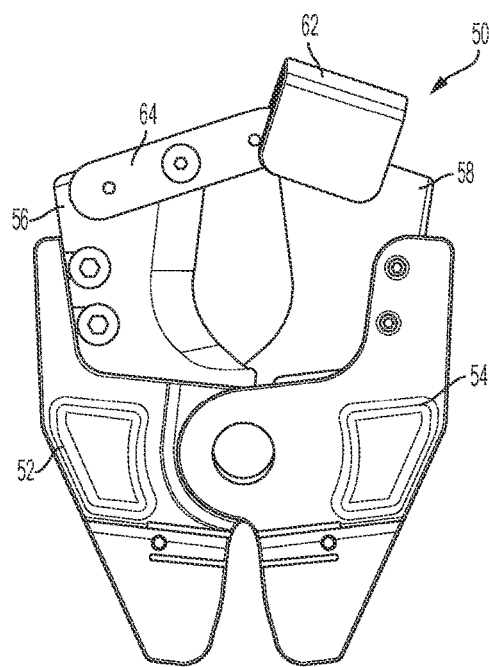
FIG. 6B illustrates another perspective of the cutting head configured with detent plungers illustrated in FIG. 6A.
Figure 6C:
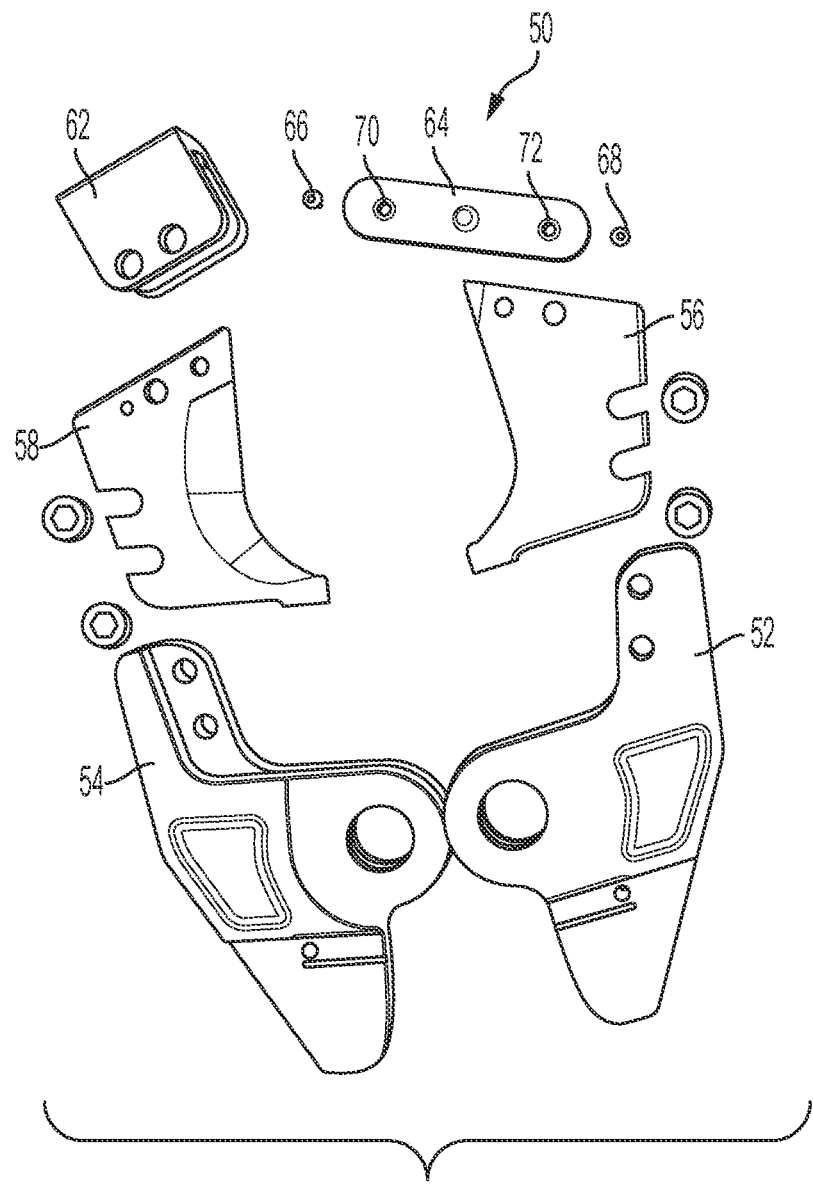
FIG. 6C illustrates an exploded view of the cutting head configured with detent plungers illustrated in FIG. 6A and FIG. 6B.

FIG. 6B illustrates another perspective of the cutting head illustrated in FIG. 6A. And FIG. 6C illustrates an exploded view of the cutting head illustrated in FIG. 6A and FIG. 6B. In particular, FIG. 6C further shows the first detent plunger 66 and the second detent plunger 68. The first detent plunger 66 may be coupled to a first slot 70 in the flange 64 and the second detent plunger 68 may be coupled to a second slot 72 in the flange 64. As such, the first detent plunger 66 and the second detent plunger 66 may be used to position the flange 64 during use of the cutting head 50. For instance, the first detent plunger 66 and the second detent plunger 66 may be used to position the flange 64 at a location away from where materials are inserted for cutting.

Figure 7A:
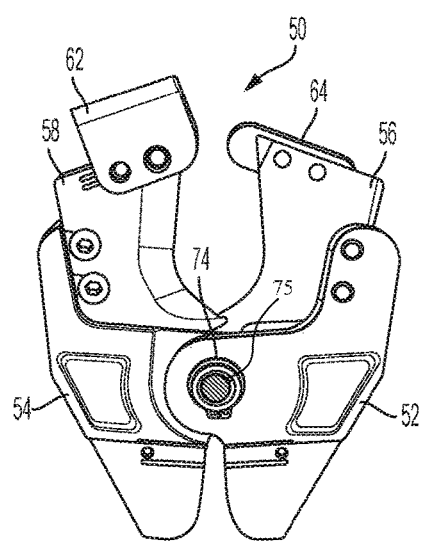
FIG. 7A illustrates a perspective view of the cutting head configured with a set of hollow pins.
Figure 7B:
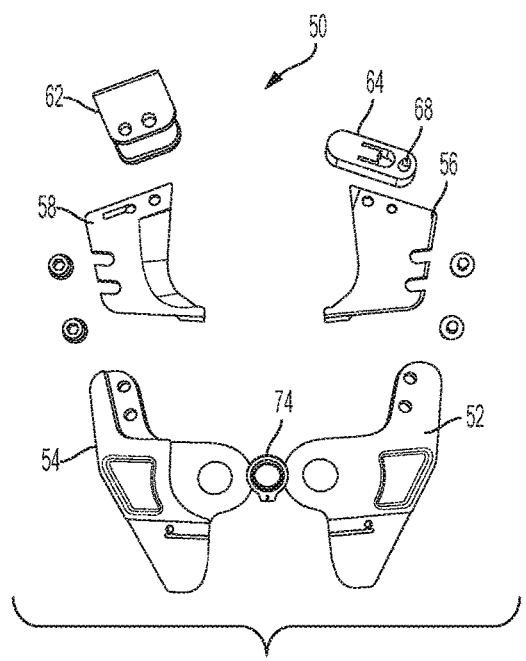
FIG. 7B illustrates an exploded view of the cutting head configured with the hollow pins illustrated in FIG. 7A.

FIG. 7A illustrates a perspective view of the cutting head 50 configured with a set of hollow pins 74. Each hollow pin 74 may extend into an opening formed between the ear of the second jaw 54 extends between the ears of the first jaw 52 in a press-fit configuration. In some examples, a pivot pin 75 is placed into the hollow pins 74 when jaws 52, 54 are connected. In some examples, the cutting head 50 may use only one hollow pin or no hollow pins at all. And FIG. 7B illustrates an exploded view of the cutting head 50 configured with the hollow pins 74 illustrated in FIG. 7A.

The presently disclosed armored cable cutter with cutting blade retention provides a number of advantages over known cutting tools and hydraulic cutting tools. For example, one advantage of the presently know cutting tool is that alignment of the blades are maintained during cutting actions due to the configuration of the flange and fixed retainer. In particular, the combination of the flange and the fixed retainer serve to guide the blades during cutting actions performed by the cutting tool. Another advantage is that the cutting head can reduce broken blades and improper cuts in material. By preventing the blades from shifting off the designed axis during a cutting action, the cutting head equipped with the flange and the fixed retainer can reduce damage to blades and ensure that the cutting head performs a cut in a material as desired. This can result in a higher quality cut performed by the cutting head.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

I claim:

1. A cutting head for a hydraulic power tool, the cutting head comprising:
   a first jaw having a first blade;
   a second jaw having a second blade;
   a flange, configured as a separate component, directly coupled to and extending from the first blade; and
   a retainer configured as a separate component from the second blade and from the first and second jaws, and removably coupled to the second blade first blade during a cutting action and receive the flange before and during the cutting action to resist movement of the first jaw or the second jaw out of alignment during the cutting action,
   the flange extending through the retainer during the cutting action so that the flange travels in one side of the inner groove and exits at another side of the inner groove.

2. The cutting head of claim 1, wherein the inner groove receives the first blade.

3. The cutting head of claim 1, wherein the flange is pivotably coupled to the first blade.

4. The cutting head of claim 1, wherein the flange includes a detent plunger to engage a hole of the first blade.

5. The cutting head of claim 1, wherein the retainer includes a first leg that overlaps with a first lateral side of the second blade and a second leg that overlaps with a second lateral side of the second blade, and
  wherein the first lateral side is opposite the second lateral side.

6. The cutting head of claim 1, wherein the retainer is fixed relative to the second blade.

7. The cutting head of claim 1, wherein the second blade is fixed within the inner groove of the retainer, and the inner groove receives the first blade during the cutting action.

8. The cutting head of claim 1, further comprising:
  a hollow pin defining an axis,
  wherein the first jaw and the second jaw rotate about the axis.

9. The cutting head of claim 1, wherein the retainer is mounted to a top portion of the second blade.

10. The cutting head of claim 1, wherein the flange is moveable between an extended position and an open position, and
  wherein in the extended position, the flange extends into the retainer during a cutting action and in the open position, the flange does not extend into the retainer.

11. The cutting head of claim 1, wherein the first blade is secured to the first jaw with a first pair of blade mount screws and the second blade is secured to the second jaw with a second pair of blade mount screws.

* * * * *